US 6,415,148 B1

(12) United States Patent
Chiniga et al.

(10) Patent No.: US 6,415,148 B1
(45) Date of Patent: Jul. 2, 2002

(54) SYSTEM AND METHOD FOR THE DETECTION OF SERVICE FROM ALTERNATE WIRELESS COMMUNICATION SYSTEMS

(75) Inventors: Yugandhar Chiniga; John R. Sorenson; Henti Tung, all of San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/458,495

(22) Filed: Dec. 11, 1999

(51) Int. Cl.$^7$ .................................................. H04Q 7/20
(52) U.S. Cl. ........................................ 455/434; 455/552
(58) Field of Search ................................... 455/426, 434, 455/415, 552, 553, 422

(56) References Cited

U.S. PATENT DOCUMENTS 6,085,085 A * 7/2000 Blakeney, II et al. ........ 455/426

FOREIGN PATENT DOCUMENTS

WO      WO97/36452     * 10/1997

\* cited by examiner

*Primary Examiner*—Nguyen T. Vo
(74) *Attorney, Agent, or Firm*—Philip R. Wadsworth; Charles D. Brown; Howard H. Seo

(57) ABSTRACT

A wireless communication system attempts to acquire service from one of a plurality of possible service provider systems. If service is acquired by a less desirable service provider system, the wireless communication system of the present invention constructs an alternate list of more desirable service provider systems and periodically attempts to acquire service from a more desirable service provider system. The wireless communication system may include a most recently used (MRU) list of recently acquired service provider systems. The MRU list may be used to sort the list of alternate service provider systems so that the alternate list of service provider systems will first list those service provider systems that are also contained in the MRU list. Data entries that are contained in both the alternate scan list and the MRU list are sorted in accordance with the position of the service provider system within the MRU list.

18 Claims, 5 Drawing Sheets

SYSTEM AND METHOD FOR THE DETECTION OF SERVICE FROM ALTERNATE WIRELESS COMMUNICATION SYSTEMS

FIELD OF THE INVENTION

The present invention relates to wireless communication systems in general and, more particularly, to a system and method for acquiring service on a more desirable system when receiving service from a less desirable system.

BACKGROUND OF THE INVENTION

Wireless communication systems, such as cellular telephones, are commonly used as a replacement for conventional telephone systems. A large number of service providers are actively competing for market share in multiple geographic regions. An individual user typically subscribes to a selected service provider and uses a wireless telephone device that is compatible with the service provider.

A user typically has a contractual obligation to the service provider wherein all billing for the wireless telephone is provided by the service provider. Indeed, users typically select service providers based on the financial arrangements of the contract and upon the areas of service coverage provided by the service provider. When the user operates the wireless telephone in a "home" region, service to the wireless telephone is typically provided by the user-selected service provider. When the user is outside the home region, the wireless telephone is said to be operating in a "Roam" mode. When operating in the Roam mode, the wireless telephone may be connected to the user-selected service provider, or some other service provider if the user-selected service provider cannot service to the wireless telephone. In either case, billing still occurs through the user-selected service provider. In the former situation, billing may be provided directly from the service provider. In the latter case, the billing from the actual service provider is forwarded to the user-selected service provider.

The wireless telephone is typically preprogrammed with the data related to various service provider systems taking into account the particular capabilities of the wireless telephone. For example, it is well known that wireless telephones can operate in either an analog mode or a digital mode, and in a cellular band or a personal communication system (PCS) band. Some wireless telephones are capable of operating in both the analog mode and the digital mode (although only one mode at a time), and some wireless telephones are capable of operating in both the cellular band and the PCS band (although only one band at a time). For a wireless telephone to communicate effectively, it must be within the operational boundaries of a wireless communication system service provider that supports the same mode and band with which the wireless telephone was designed to operate.

When first powered up, wireless telephones scan for a service provider whose system is compatible with the wireless telephone. Depending on the service provider and the corresponding mode/band, a service provider system may or may not be compatible. Typically, there are several hundred service provider systems that are programmed into the wireless telephone. The wireless telephone must sequentially scan the entire list in an attempt to acquire service. As a result, the service acquisition process can be cumbersome and consume a significant amount of time.

This cumbersome nature is reduced by the fact that conventional telephones normally look on only 42 PCS channels, or 2 or 4 cellular channels (depending on whether the cellular channels are configured for Code Division Multiple Access (CDMA) or Advanced Mobile Phone System (AMPS)). Once service is acquired, the telephone attempts to determine if the acquired system is one of the several hundred compatible systems. The process is thus seem as remaining quite cumbersome, albeit not quite as cumbersome as it first appeared. Therefore, it can be appreciated that there is a significant need for a system and method to reduce the number of service provider systems that must be scanned for service, thereby minimizing the typical time to acquire a service provider system. The present invention provides this and other advantages as will be apparent from the following description and accompanying figures.

DETAILED DESCRIPTION OF THE PREFERRED EMBODIMENTS

Figure 1:
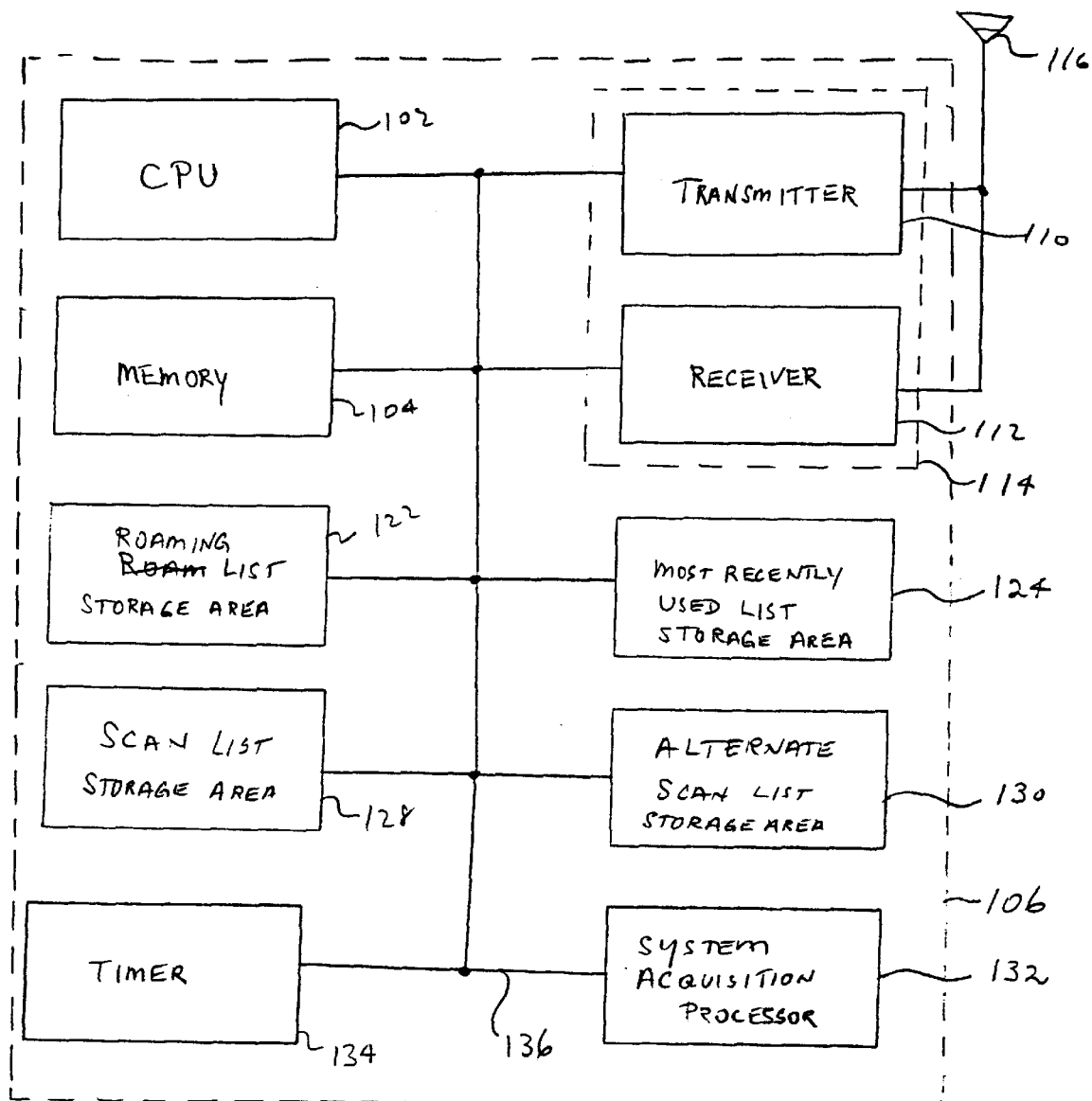
FIG. 1 is a functional block diagram of a system designed in accordance with the principles of the present invention.

As previously noted, a wireless telephone must scan for a compatible service provider whenever the wireless telephone is first powered up. A data table or other suitable structure, sometimes referred to as a "Roaming" list or a "Preferred Roaming List" (PRL), provides data related to all possible service providers for the particular wireless telephone. When operating in the Roam mode (or, for that matter, at home), the wireless telephone uses the Roaming list in an attempt to acquire service in a particular geographic region.

For purposes of illustration, suppose a user of a wireless telephone travels from the geographic region of their particular "Home" service provider (e.g., the wireless service provider with whom the user contracted to provide wireless service) to another geographic region and therefore is operating in the Roam mode. Under these circumstances, the wireless telephone must detect and acquire a wireless service provider system. In any given geographic region, wireless service provider systems may comprise analog system service providers, commonly referred to as an advanced mobile phone service (AMPS) system, or a digital system, such as, by way of example, a code division multiple access (CDMA) system. Because the wireless telephone has no advanced knowledge of the user's present geographic location, the wireless telephone selects the service provider system based on one or more selection criteria.

When powered on, the wireless telephone scans for any suitable wireless service provider based on criteria, such as signal strength of the wireless service provider's system, the wireless telephone's mode of operation, the wireless telephone's band of operation, and on the particular channel availability. The wireless telephone selects the first service provider system that it encounters that meets the criteria for the particular wireless telephone.

The present invention provides a unique list of preferred service providers that can decrease the time required to select a system and can provide a technique by which the wireless telephone can switch from a less desirable service provider system to a more desirable service provider system. The present invention utilizes existing system classifications to develop a list of more preferred service provider systems and periodically attempts to establish a communication link with a more desirable service provider system.

A particular system may be referred to as a "most desirable" service provider system, a "more desirable" service provider system, or a "less desirable" service provider system. The most desirable service provider system may have that designation for a number of different reasons. For example, the most desirable system may be the service provider system operated by the user-selected service provider. A more desirable system may be a service provider system with which the user-selected service provider has a contractual arrangement for reduced billing rates when the wireless telephone is operating in the Roam mode. A least-desirable system may be a service provider system with which the user-selected service provider has no contractual arrangement and which would result in significantly increased cost for service to the user. In addition to these contractual arrangements, other criteria, such as compatibility with the wireless telephone can be taken into account in designating a service provider system as most desirable, more desirable, or less desirable. For example, the wireless telephone may be a dual-mode telephone capable of operating in a CDMA digital mode or AMPS mode. In normal operation, it would be preferred to connect the wireless telephone to a CDMA service provider. Accordingly, a CDMA service provider may be designated as a most desirable service provider (or more desirable service provider) while an AMPS service provider may be designated as a less desirable service provider.

In known wireless communication systems, the designation as most desirable, more desirable, and less desirable are part of the data programmed into the Roaming list. However, in normal operation, the wireless communication device simply scans sequentially until it acquires an acceptable service provider for the current geographical location. Once service is acquired, the wireless communication device makes an attempt to establish a communication link with a more desirable service provider system, but in no particular order. In contrast, the present invention provides a technique by which this alternate scan list is generated and lists more desirable service provider systems for the current geographical region, based on the more recently used systems. The wireless communication device periodically attempts to establish a communication link with a more desirable service provider system in an attempt to improve service delivery for the user.

The present invention is embodied in a system 100, illustrated in the functional block diagram of FIG. 1. The system 100 includes a central processing unit (CPU) 102 and a memory 104. The CPU 102 executes instructions and data stored in the memory 104. The memory 104 may comprise read-only memory (ROM), random access memory (RAM) as well as non-volatile random access memory (NVRAM).

The components illustrated in FIG. 1 may typically be incorporated into a single wireless communication device contained within a case 106. Although discussed herein as a wireless telephone, it is clear that the present invention is applicable to any form of wireless radio communication, such as cellular, PCS, radio telephone, or the like.

The system 100 also includes a transmitter 110 and receiver 112. The transmitter 110 and receiver 112 may be combined to form a transceiver 114. The transmitter 110 and receiver 112 are coupled to an antenna 116. The transmitter 110, receiver 112, and antenna 116 operate in a well-known manner. Accordingly, these components need not be described in greater detail.

The system also includes a roaming list storage area 122. The roaming list storage area 122 may be a portion of the memory 104 or a separate storage area. The roaming list storage area 122, which will be described in greater detail below, contains data related to all known service provider systems. The system 100 utilizes the data in the roaming list storage area 122 to locate a compatible wireless service provider. As those skilled in the art can appreciate, a typical roaming list may contain hundreds of entries. It is impractical for a wireless telephone to search through an entire list of 300 entries each and every time service is to be provided. Even a somewhat smaller list is impractical, as noted above. The list is preferably made much smaller.

To improve the speed of acquisition, the system 100 also includes a most recently used (MRU) list storage area 124. The use of an MRU list is well known in the art. Briefly, the MRU list contains data for a predetermined number of recently acquired service provider systems. In an exemplary embodiment, the MRU list storage area 124 contains data for the last 12 service providers acquired by the system 100. The MRU list storage area 124 may be a portion of the memory 104 or a separate storage area. The fundamental theory behind the use of an MRU list is that the last service provider acquired by the wireless telephone is a good starting place for acquiring a current service provider. The system 100 will use the data from the MRU list storage area 124 and, alternatively use data from the roaming list storage area 122 in an attempt to find a compatible service provider system.

In normal operation, a scan list is constructed and stored in a scan list storage area 128 each time service is to be provided. The scan list storage area 128 may be a portion of the memory 104 or a separate storage area. The scan list, which is known in the art, is typically constructed using the data from the MRU list storage area 124 and data from the roaming list storage area 122. In an exemplary embodiment, the system 100 will take the data from MRU list storage area 124 and place it in the scan list storage area 128 followed by the remaining data from the roaming list storage area 122. The system 100 need not use data from the roaming list storage area 122 that corresponds to any data from the MRU list storage area 124. Therefore, the scan list storage area 128 will not contain duplicate entries.

The system 100 sequentially steps through the data in the scan list storage area 128 in an effort to acquire a compatible service provider system. As noted above, the data initially used by the system 100 in the scan list storage area 128 corresponds to the data from the MRU list storage area 124. Thus, the system 100 will attempt to acquire one of the 12 previously acquired service provider systems before resorting to the data from the roaming list storage area 122.

Under certain circumstances, the system 100 may acquire a service provider system that is not the most desirable system for the particular geographic area. Utilizing the principles of the present invention, the system 100 also generates data related to more desirable or the most desirable service provider systems for the particular geographic area and stores the data in an alternate scan list (ASL) storage area 130. The ASL storage area 130 may be a portion of the memory 104 or a separate storage area. The construction and the sequencing of data in the ASL storage area 130 will be described in detail below.

A system acquisition processor 132 will determine if the presently acquired service provider system is the most desirable service provider system for the present geographic location. If not, the system acquisition processor 132 initiates the construction of the alternate scan list and the storage of the data in the alternate scan list storage area 130. The system acquisition processor 132 further initiates a request for acquisition of a more desirable or most desirable service provider system. The operational details of the system acquisition processor 132 are provided below.

As will also be described in greater detail below, the system 100 periodically attempts to acquire a more desirable service provider system if the presently acquired service provider system is not the most desirable service provider system for the present geographic location. A timer 134 generates periodic pulses to initiate an attempt to acquire a more desirable service provider system. The timer 134, which may be part of the CPU, provides periodic pulses that may be dependent upon the presently acquired service provider system. Details of the timer 134 and its use in acquiring a more desirable service provider system are described below.

The various components described above are coupled together by a bus system 136. The bus system 136 may comprise a power bus, address bus, and control bus in addition to a data bus. However, for the sake of convenience, the various busses are illustrate in FIG. 1 as the bus system 136. It should be noted that certain components illustrated in FIG. 1 may in fact be implemented by the CPU 102. For example, the system acquisition processor 132 may be implemented by the CPU 102 executing instructions from the memory 104. Similarly, the timer 134 may be part of the CPU 102. However, FIG. 1 illustrates each of these components as a separate block since each performs a separate function.

In operation, the system 100 constructs a scan list whenever the wireless telephone is operating in the Roam mode (or, as noted above, at home). As discussed above, the scan list comprises data from the MRU list storage area 124 and data from the roaming list storage area 122. The structure of data in the roaming list storage area 122 is known in the art and will only be discussed briefly herein. A simplified sample Roaming List is shown in Table 1 below. It should be noted that the sample Roaming List of Table 1 represents only a small portion of a typical Roaming List, which may contain 300 or more entries.

ciate that the actual SID values are more than one numeric digit in length and may not be contained in the Roaming List in numeric order.

The "Mode" refers to whether the system is digital (CDMA; other digital schemes are possible, but not preferred) or analog (AMPS). The "Band Class" refers to the frequency band on which the system operates, 800 MHz for cellular, and 1900 MHz for PCS.

The "Channel" or "Block Number" refers to the channel number or block of channel numbers from which the system 100 may attempt to acquire service. The Block or Channel Number is specified under FCC standards, or in accordance with industry standards, such as Table 2.1.1.1-4 ANSI J-STD-008. This data field need not be described in greater detail herein.

The Roaming List also includes a "Geographic Region" data field to indicate when systems in the Roaming List are from a new geographic region. In the example of Table 1,systems 1, 2, and 7 are each new geographic regions. However, systems 3–6 are from the same geographic region as the previous entry (i.e., the geographic region associated with the system 2). As will be discussed below, the system 100 uses the geographic region data in assembling the data for the ASL storage area 130.

Figure 2:
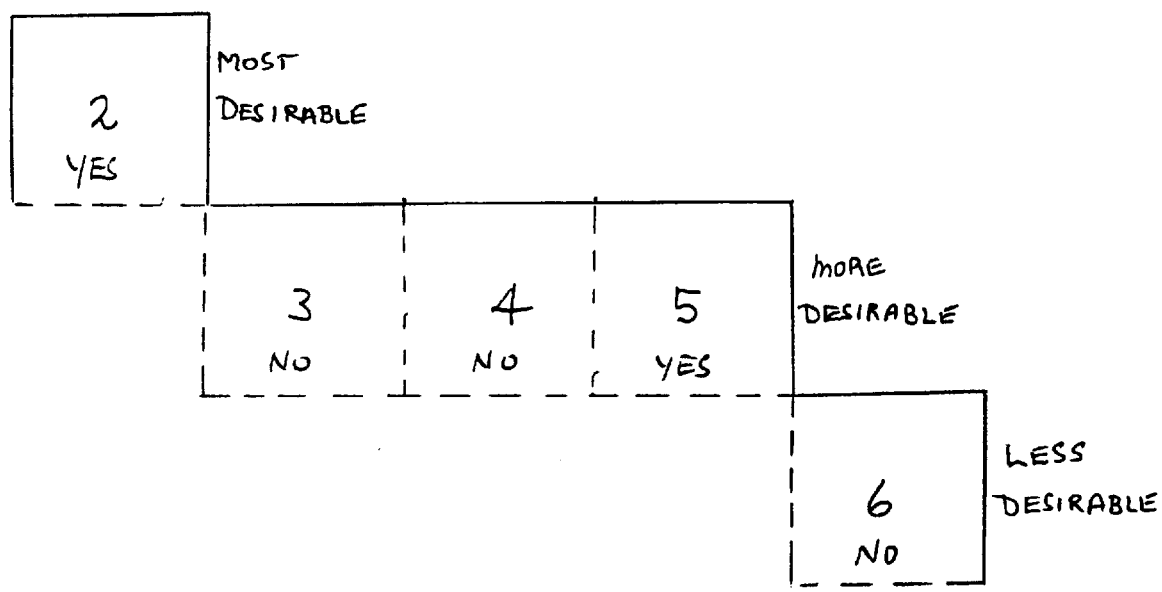
FIG. 2 illustrates a hierarchical categorization of service provider systems used by the system of FIG. 1.

In addition, the Roaming List of Table 1 includes a "More Desirable" data field and a "Preferred" data field. As discussed above, certain service provider systems within a particular geographic area may be more desirable than others based on criteria, such as service provider contracts and the like. In the example of Table 1, systems 2–6 are all from the same geographic region. Within that geographic region, system 2 is considered the most desirable service provider system while systems 3, 4, and 5 are considered more desirable service provider systems compared to system 6. In an exemplary embodiment, the Roaming List will have the most desirable service provider system for a particular geographic region listed first for that geographic region. The "YES" in the "More Desirable" data field indicates the desirability of a particular service provider system with respect to service provider system that follow is in the Roaming List. This concept is illustrated in FIG. 2 where the system 2 is the most desirable service provider system, systems 3–5 are more desirable service provider systems and system 6 is a less desirable service provider system. If the

TABLE 1

Roaming List

| SID | MODE | BAND CLASS | BLOCK OR CHANNEL NUM | GEO REGION | MORE DESIRABLE | PREFERRED |
|---|---|---|---|---|---|---|
| 1 | CDMA | PCS | 25 | New | NO | Preferred |
| 2 | CDMA | PCS | 125 | New | YES | Preferred |
| 3 | CDMA | PCS | 425 | Same | NO | Preferred |
| 4 | CDMA | PCS | 925 | Same | NO | Preferred |
| 5 | CDMA | PCS | 975 | Same | YES | Preferred |
| 6 | AMPS | Cellular | A | Same | NO | Preferred |
| 7 | AMPS | Cellular | B | New | | Negative |

Included in the Roaming List is a service provider system identification number (SID). This data field may contain specific identification data that the wireless telephone may use to acquire a service provider system or may contain a wild card (*) to indicate that any value for the SID is acceptable. For the sake of clarity, Table 1 simply lists the SID in numerical order. Those skilled in the art will appresystem 100 acquires the system 2 (i.e., the most desirable service provider system), there is no need to construct the ASL or store data in the ASL storage area 130 (see FIG. 1). However, if the system 100 acquires any other service provider system (i.e., system 3–6), the system acquisition processor 132 will store data for more desirable service provider systems in the ASL storage area 130. For example, if the system 100 acquires the system 6 (i.e., the least desirable service provider system), the systems 2–5 will all be placed in the ASL storage area 130 since any of these service provider systems is more desirable than the acquired system. However, if the system 100 initially acquires a more desirable service provider system (i.e., the systems 3–5), only the system 2 would be placed in the ASL storage area 130 since only the system 2 would be more desirable than the acquired system. Thus, the system 100 will strive to improve the service provider system until the most desirable service provider system for that particular geographic region has been acquired. Although FIG. 2 illustrates only three levels, those skilled in the art will recognize that multiple levels of "more desirable" service provider systems are possible.

As will be discussed in detail below, the system 100 will acquire a service provider system within a particular geographic area. If the acquired service provider system is not the most desirable system, the alternate scan list will be constructed and the wireless telephone will periodically attempt to acquire a more desirable service provider system for the particular geographic region. The process will continue until the system 100 has acquired the most desirable service provider system in the particular geographic region.

The "Preferred" data field indicates whether the wireless telephone can acquire a particular service provider system. A negative value in this data field indicates that the wireless telephone must not provide service on this service provider system. The acquisition of such a negative system may still be valuable, however, since it may help in indicating the geographic region in which the telephone is operating. It should be noted, however, that emergency communication services may be provided on any service provider system, regardless of a negative entry in the Preferred data field.

As noted above, the data in the scan list comprises data from the MRU list storage area 124 and the roaming list storage area 122. The data contained in the roaming list storage area 122 is discussed above with respect to Table 1. Sample data from the MRU list storage area 124 is shown below in Table 2.

TABLE 2

MRU List

| MODE | BAND | CHANNEL/SYSTEM |
|------|------|----------------|
| CDMA | PCS | 300 |
| CDMA | PCS | 100 |
| AMPS | Cellular | A |
| CDMA | PCS | 975 |

The "Mode" and "Band" have been previously discussed. The "Channel/System" refers to the specific channel or AMPS system on which the service was last acquired. Although the MRU list storage area 124 may contain more entries, the example of Table 2 includes only a portion of the data that may be contained in the MRU list storage area.

In operation, the system acquisition processor 132 will attempt to acquire a service provider system using the data in the scan list storage area 128. Following acquisition of a service provider system, the system acquisition processor 132 determines whether the acquired system is the most desirable for that specific geographic location. This analysis may be readily performed by the system acquisition processor 132 using data from the PRL. The data in the PRL includes the More Desirable data field shown above in Table 1. For example, if the wireless telephone acquired the system 6, the system acquisition processor 132 will construct the alternate scan list (ASL) containing data entries of more desirable service provider systems. Once the processor builds the ASL, it scans it. If something is acquired, the processor keeps the telephone on that system, and possibly builds a new ASL (if there is a more desirable service in the same region). If the processor does not find a more desirable service, it periodically scans for such a more desirable service.

The alternate scan list is assembled by listing all service provider systems in the current geographical area that are more desirable service provider systems than the acquired service provider system. In the example discussed above, where the wireless telephone has acquired service on the system 6, the service provider systems 2–5, which are in the same geographic area as the system 6, are all associated with more desirable service provider systems. Accordingly, the system acquisition processor 132 generates an alternate scan list, such as illustrated in Table 3 below.

TABLE 3

Unsorted ASL

| CHANNEL | MODE | BAND |
|---------|------|------|
| 125 | CDMA | PCS |
| 425 | CDMA | PCS |
| 925 | CDMA | PCS |
| 975 | CDMA | PCS |

In an exemplary embodiment, the system acquisition processor 132 uses the timer 134 to periodically attempt to acquire service on one of the more desirable service provider systems listed in the ASL storage area 130. The time period measured by the timer 134 may be dependent on the acquired service provider system. For example, if the present service provider system is a digital system (e.g., CDMA), the system acquisition processor 132 will attempt to acquire a more desirable service provider system approximately every two minutes. In contrast, if the present service provider system is an AMPS system, the system acquisition processor 132 will attempt to acquire a more desirable system approximately every one minute. This is because any digital system is likely to be more desirable than an AMPS system due to power consumption, bandwidth requirements, and the like. However, those skilled in the art should recognize that the timer 134 may be programmed for any convenient time duration.

Those skilled in the art will also recognize that the system acquisition processor 132 cannot continually search for a more desirable service provider system since the typical wireless telephone has only one receiver (i.e., the receiver 112). If the system acquisition processor 132 spent its entire time trying to acquire a more desirable service provider system, the receiver 112 would be unable to receive paging messages and therefore would never receive an incoming call. Therefore, the system acquisition processor 132 will attempt to acquire a more desirable service provider system at periods specified by the timer 134. Thus, when the wireless telephone has acquired service from a less desirable service provider system, the present invention makes a list of more desirable service provider systems and periodically attempts to acquire service from one of the more desirable service provider systems. It should be noted that the system 100 only makes attempts at acquiring a more desirable service provider system when the wireless telephone is in the idle mode. If the user is engaged in an ongoing communication, the system 100 does not attempt to acquire a more desirable service provider system. However, when the user completes the call and the system 100 returns to the idle mode, the system acquisition processor 132 will reinitiate the attempts to acquire a more desirable service provider system.

In another exemplary embodiment, the system acquisition processor 132 will sort the data in the ASL storage area 130 using the data in the MRU list storage area 124. That is, any data entries in the ASL storage area 132 that are also present in the MRU list storage area 124 will be sorted according to their occurrence and position in the MRU list storage area. In other words, all ASL entries with a matching MRU entry are "bubbled up" to the top of the ASL and arranged according to their position in the MRU list.

In the example illustrated in Table 3, which is an unsorted ASL, the more preferred service provider systems are listed in the order in which they occurred in the scan list storage area 128 (see Table 1). However, one of the more desirable service provider systems (e.g., the CDMA channel 975, PCS band) is also present in the MRU list (see Table 2). This indicates that the CDMA channel 975 was recently acquired by the wireless telephone. In accordance with this embodiment of the system 100, the ASL is sorted such that service provider systems that are in the MRU list are given a higher priority than more preferred systems that are not present in the MRU list. Accordingly, the system acquisition processor 132 will generate a sorted ASL, as shown below in Table 4.

TABLE 4

Sorted ASL

| CHANNEL | MODE | BAND |
|---|---|---|
| 975 | CDMA | PCS |
| 125 | CDMA | PCS |
| 425 | CDMA | PCS |
| 925 | CDMA | PCS |

In this embodiment, the system acquisition processor 132 will attempt to acquire a more desirable service provider system using data from the ASL storage area 130, which has been sorted in accordance with data from the MRU list storage area 124. In this manner, the system 100 will attempt to acquire service from a service provider system with which the wireless telephone was more recently connected. If SID 5 is acquired on PCS CDMA channel 975, the system acquisition processor 132 (see FIG. 1) will generate revised data for the ASL storage area 130 SO that only PCS CDMA channel 125 is placed in the ASL storage area since it is the only service provider system that is more desirable than the acquired system (i.e., SID 5).

Figure 3:
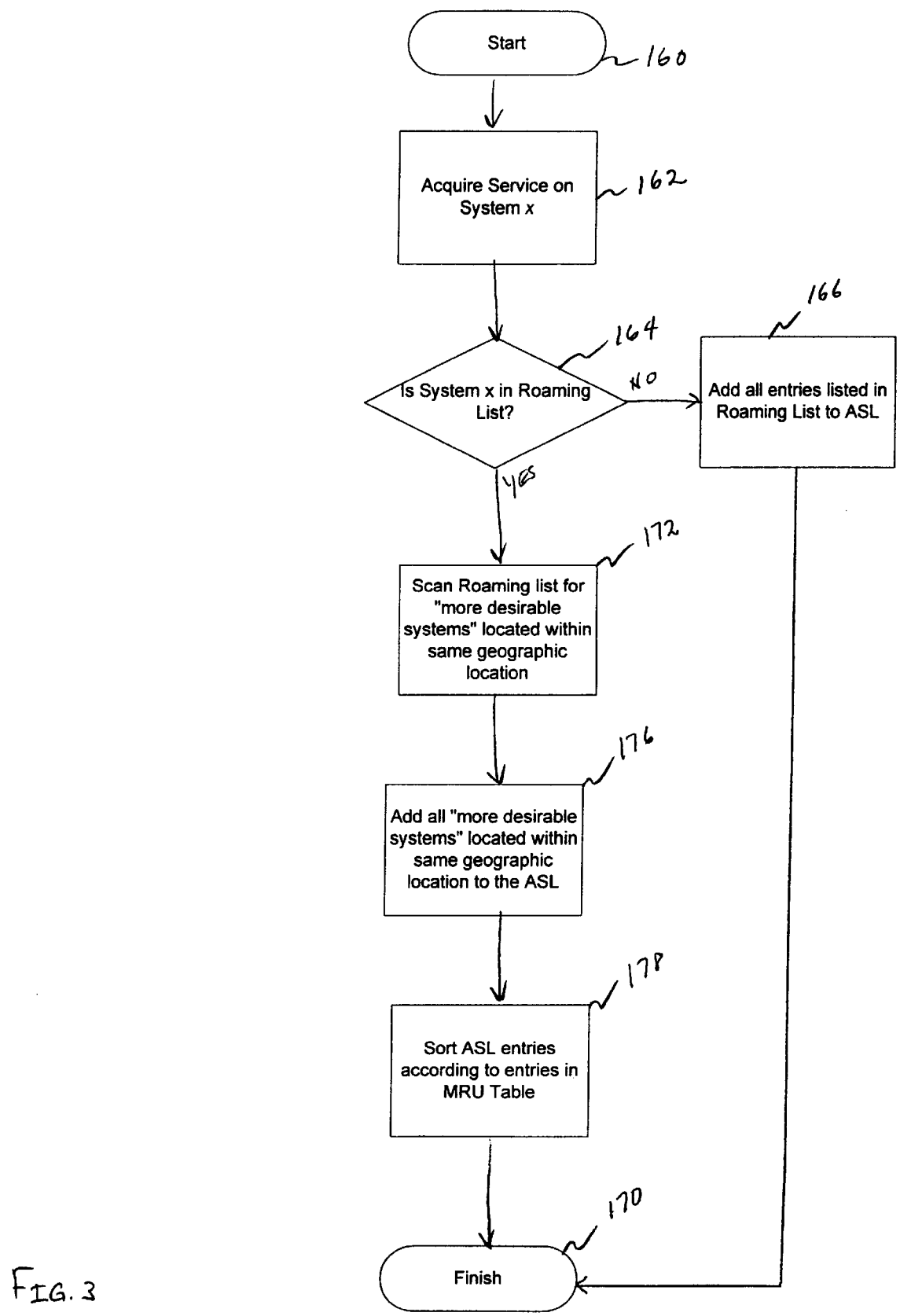
FIG. 3 is a flowchart illustrating the system of FIG. 1 to generate a list of alternative service provider systems.

The process of constructing and sorting the ASL is illustrated in the flowchart of FIG. 3. At a start 160 it is assumed that the wireless telephone is under power. In step 162, the system acquisition processor 132 (see FIG. 1) attempts to acquire service on a system, designated in FIG. 3 as system X. In decision 164, the system 100 determines whether the acquired system X is contained within the roaming list storage area 122. If the system X is not in the roaming list storage area 122, the result of decision 164 is NO. With this result, it is assumed that any other service provider system is preferable to the system X. Accordingly, in step 166, the system acquisition processor 132 adds all data entries from the roaming list storage area 122 to the alternate scan list storage area 130. Thus, the ASL contains all possible service provider systems. Following the execution of step 166, the system proceeds to step 178, described below.

If the system X is present in the roaming list storage area 122 (regardless of whether it is "preferred" or "negative"), the result of decision 164 is YES. In that event, in step 172 the system acquisition processor 132 (see FIG. 1) scans the roaming list for more desirable service provider systems located within the same geographic region. In step 176, the system acquisition processor 132 adds all more desirable systems located within the same geographic region to the ASL storage area 130. At this point, the ASL storage area 130 contains the more desirable service provider systems in the same geographic location as the system X. In step 178, the system acquisition processor 132 sorts the entries in the ASL storage area 130 in accordance with their present position in the MRU list storage area 124. As noted above, moving ASL entries that are present in the MRU list storage area 124 to the top of the ASL increases the opportunity to acquire a service provider system that has recently been acquired by the wireless telephone and thus decreases the average time to acquiring a more desirable service provider system. Following the sorting process in step 178, the system 100 finishes at 170. At this point, the ASL has been constructed and the ASL storage area 130 contains all of the service provider systems that are considered to be more desirable than the system X.

Figure 4A:
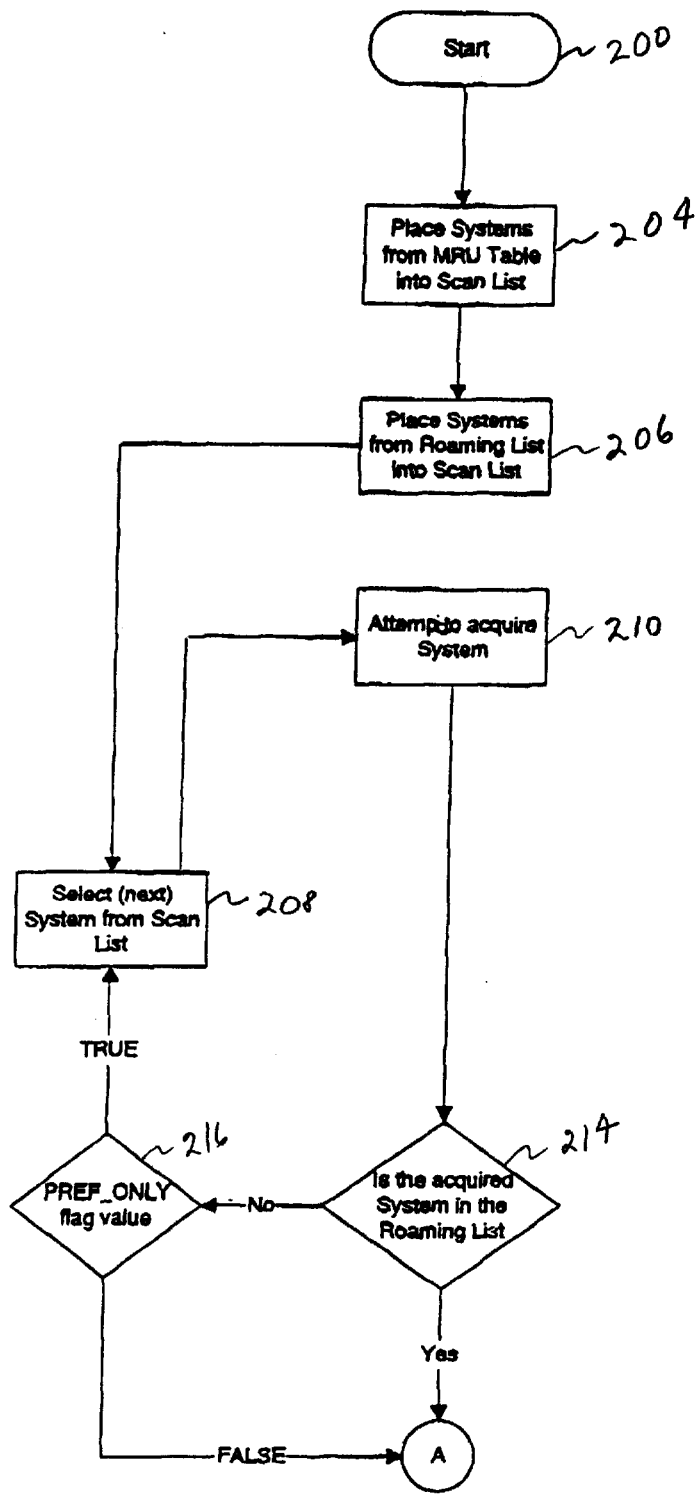
FIGS. 4A and 4B together form a flowchart illustrating the operation of the system of FIG. 1.
Figure 4B:
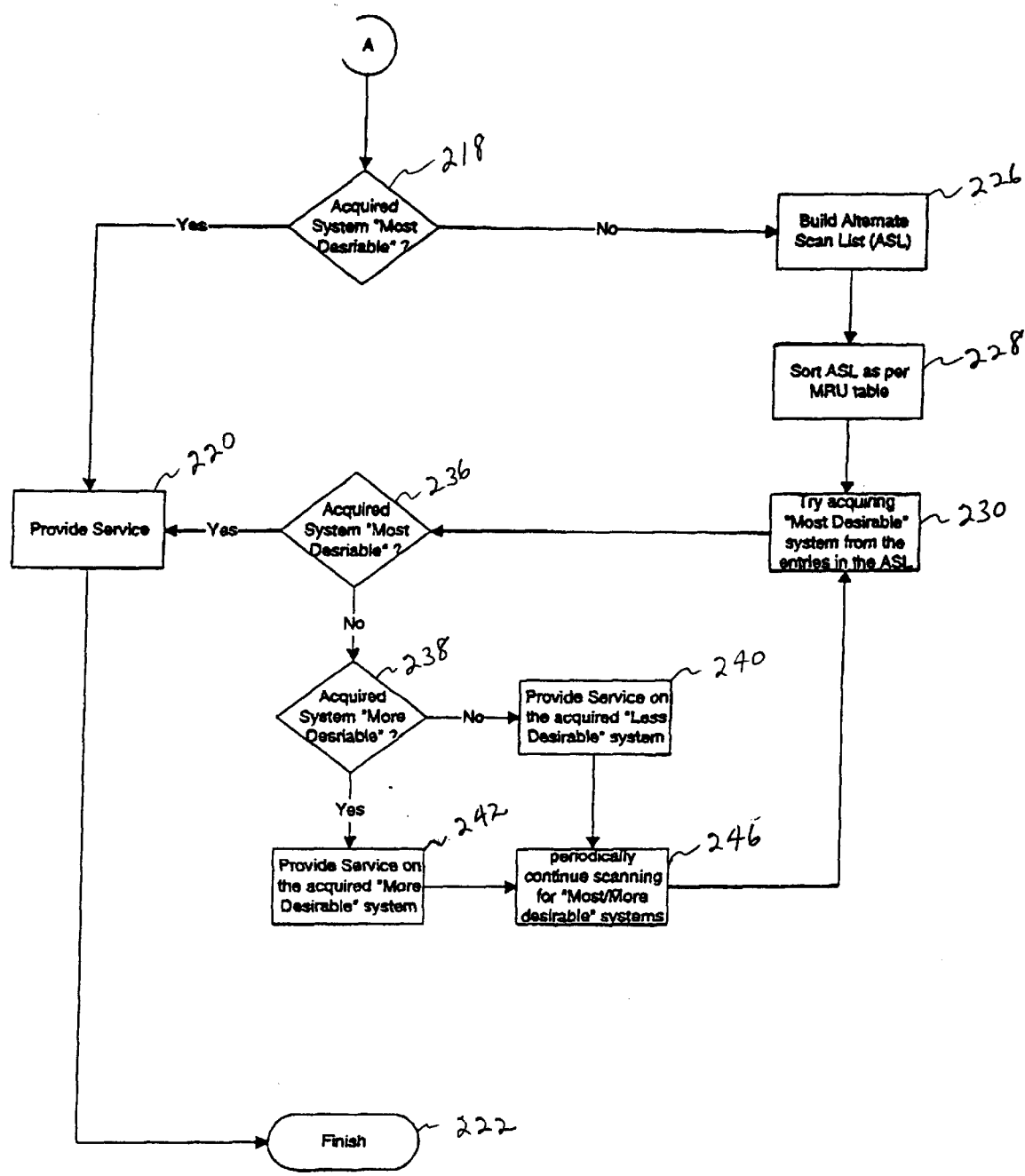

The process of acquiring a service provider system is illustrated in the flowchart of FIGS. 4A and 4B. In step 200, the wireless telephone is under power. It is assumed, for the sake of discussion, that the wireless telephone is operating in the Roam mode. In step 204, the system 100 begins to build a scan list by placing data from the MRU list storage area 124 into the scan list storage area 128. In step 206, the system 100 places the data from the roaming list storage area 122 into the scan list storage area 128. As noted above, the system 100 will exclude data from the roaming list storage area 122 that is already present in the scan list storage area 128 by virtue of its presence in the MRU list storage area 124. This process avoids duplicate entries in the scan list storage area 128. It should be further noted that the embodiment of the system 100 illustrated in FIG. 1 illustrates a separate roaming list storage area 122 and scan list storage area 128. However, those skilled in the art can appreciate that data from the MRU list storage area 124 and the roaming list storage area 122 may be used directly without having to read the data from those storage areas and to store it in a separate storage area (i.e., the scan list storage area 128).

In step 208, the system acquisition processor 132 (see FIG. 1) selects an entry from the scan list storage area 128 and, in step 210, attempts to acquire service from the selected service provider system. In decision 214, the system 100 determines whether the acquired system is in the roaming list. It should be noted that the roaming list storage area 122 is typically programmed at the time the wireless telephone is manufactured or at the time the user initiates service with the user-selected service provider. Thus, the data in the roaming list storage area 122 can only be accurate up to the point of programming. As those skilled in the art can appreciate, new and improved service provider systems are continuously being added that are available to provide service to the wireless telephone, but are not included in the roaming list storage area 122.

If the acquired service provider system is not in the roaming list, the result of decision 214 is NO. In that event, the system 100 moves to decision 216 to determine whether a preferred only flag has been set by the system. Under some circumstances, the user-selected service provider may wish to limit acquisition of a service provider system to service provider systems that are contained within the roaming list storage area 122 (see FIG. 1). If this is the case, the preferred only (PREF_ONLY) flag has a TRUE value and the system 100 returns to step 208 to select the next service provider system from the scan list storage area 128. If the PREF_ONLY flag is not set, the system 100 will allow acquisition of the service provider system even if the acquired service provider system is not present in the roaming list storage area 122 (i.e., the PREF_ONLY flag has a FALSE value). If the acquired system is present in the roaming list storage area 122, the result of decision 214 is YES. In that event, or if the PREF_ONLY flag has a FALSE value, the system 100 moves to decision 218, shown in FIG. 4 to determine whether the acquired system is the most desirable service provider system.

If the acquired service provider system is the most desirable service provider system, the result of decision 218 is YES. In that event, the system 100 provides service to the wireless telephone in step 220 and finishes the process at 222. It should be noted that the system acquisition processor 132 (see FIG. 1) need not construct the ASL if service has already been acquired with the most desirable service provider system.

In the event that service has been acquired with a system other than the most desirable service provider system, the result of decision 218 is NO. In that event, in step 226, the system acquisition processor 132 (see FIG. 1) constructs the ASL. The process of generating the ASL has been described in the flowchart of FIG. 2. As previously noted, the system acquisition processor 132 determines which service provider systems for the local geographic region are more desirable based on data entries, such as illustrated in Table 1.

In step 228, the system acquisition processor may sort the ASL using data in the MRU list storage area 124, as described above. It should be noted that this step is identical to step 278 in FIG. 3. This step is not essential to the successful operation of the system 100, but may increase the likelihood of acquiring a more desirable service provider system since the service provider systems listed in the MRU were recently acquired by the wireless telephone.

In step 230, the system acquisition processor 132 attempts to acquire the most desirable service provider system from among the entries in the ASL storage area 130. As previously noted, the system acquisition processor 132 will attempt to acquire a more desirable service provider system periodically, based on time periods measured by the timer 134 (see FIG. 1).

In decision 236, the system acquisition processor 132 (see FIG. 1) determines whether the newly acquired service provider system is the most desirable system. In the event that the newly acquired service provider system is the most desirable service provider system, the result of decision 236 is YES, and, in step 220, the system 100 provides service to the wireless telephone via the newly acquired most desirable system and ends the process at 222. As noted above, there is no need for further analysis at this stage since the wireless telephone has now acquired service from the most desirable service provider system in the local geographic region.

If the newly acquired service provider system is not the most desirable system, the result of decision 236 is NO. In that event, the system 100 moves to decision 238 to determine whether the newly acquired system is more desirable than the presently provided service provider system. If the newly acquired service provider system is not more desirable than the presently acquired service provider system, the result of decision 238 is NO. In that event, in step 240 the system acquisition processor 132 continues to provide service on the presently less desirable service provider system. If the newly acquired service provider system is more desirable than the presently acquired service provider system, the result of decision 238 is YES. In that event, in step 242, the system acquisition processor 132 (see FIG. 1) will provide service to the wireless telephone on the newly acquired more desirable service provider system.

In either event, following the operation in step 240 or step 242, the wireless telephone is still not connected to the most desirable service provider system. In step 246, the system acquisition processor 132 (see FIG. 1) will continue periodically scanning for a more desirable service provider system or the most desirable service provider system. The system 100 returns to step 230 and continues in its attempt to acquire the most desirable service provider system for the local geographic region. Thus, the system 100 will acquire service from the most desirable service provider system when possible. When such acquisition is not yet completed, the system 100 constructs an alternate scan list containing a list of service provider systems that are more desirable than the current service provider system and periodically attempts to improve operations by acquiring a more desirable service provider system or the most desirable service provider system.

As discussed above with respect to the flowchart of FIGS. 4A and 4B, the wireless telephone may subsequently acquire a system that is not the most desirable. However, in accordance with the invention, and as illustrated in FIGS. 4A and 4B, the system 100 will revise the ASL and subsequently attempt to acquire service from a more desirable service provider system and have the ultimate goal of acquiring the most desirable service provider system for the particular geographic region.

It is to be understood that even though various embodiments and advantages of the present invention have been set forth in the foregoing description, the above disclosure is illustrative only, and changes may be made in detail, yet remain within the broad principles of the invention. For example, the invention has been described with respect to a wireless telephone, such as a cellular phone. However, the principles of the invention are readily applicable to any wireless radio communication system where service may be acquired by multiple service providers. In addition, the invention has been described only with respect to roaming. However, the principles of the present invention may also apply to a wireless telephone operating within its home region. Anytime the wireless telephone acquires service with a less desirable service provider system, the alternate scan list may be constructed so as to allow the wireless telephone to periodically attempt to acquire service on a more desirable service provider system. In addition, the use of separate storage areas for the various lists, as illustrated in FIG. 1, is for the sake of convenience in describing the invention. However, those skilled in the art will recognize that other forms of data storage and processing may be used. For example, the roaming list storage area 122 need not be physically copied into the scan list storage area 128 or the ASL storage area 130. Rather, known techniques may be used to extract data from the roaming list storage area 122 for subsequent processing as a scan list or ASL. Therefore, the present invention is to be limited only by the appended claims.

What is claimed is:

1. A wireless communication system to establish a communication link with a selected service provider system, the system comprising:

a first data structure containing data related to a plurality of possible service provider systems that may provide service to a wireless communication device, the data structure containing data indicating a selected one of the plurality of service provider systems in a particular geographic region as a more desirable service provider system than other ones of the plurality of service provider systems in the particular geographic region;

a system selection processor to acquire service from one of the plurality of possible service provider systems, the system selection processor further determining if the acquired service provider system is the more desirable service provider system in the particular geographic region;

a second data structure containing data related to selected ones of the plurality of service providers in the particular geographic region that are classified as more desirable service provider systems than the acquired service provider system, the system selection processor periodically attempting to acquire service from the selected ones of the plurality of service providers in the particular geographic region that are classified as more desirable systems than the acquired service provider system; and a third data structure containing data related to a predetermined number of service provider systems which previously provided service to the wireless communication device, the system selection processor sorting the data in the second data structure using the data in the third data structure wherein data in the second data structure related to more desirable service provider systems are sequenced in the second data structure based or, the presence and sequence of the same service provider systems in the third data structure.

2. The system of claim 1 wherein the system selection processor generates data for the second data structure only if the acquired service provider system is not the more desirable service provider system in the particular geographic region.

3. The system of claim 1 wherein the system selection processor periodically attempts to acquire service from the selected ones of the plurality of service providers in the particular geographic region only if the acquired service provider system is not the more desirable service provider system in the particular geographic region.

4. The system of claim 1, further comprising a timer to generate periodic signals, the system selection processor periodically attempting to acquire service from the selected ones of the plurality of service provider systems in the particular geographic region upon receipt of the periodic signals.

5. The system of claim 1, further comprising a third data structure containing data related to a predetermined number of service provider systems which previously provided service to the wireless communication device, the system selection processor initially using data from the third data structure to acquire a service provider system.

6. The system of claim 1 wherein the system selection processor attempts to acquire a more desirable service provider system in a sequenced order using the sorted data in the second data structure.

7. A wireless communication system to establish a communication link with a service provider system, the system comprising:

a roaming list containing a plurality of possible service provider systems that may provide service to a wireless communication device, at least a selected one of a plurality of service provider systems in a particular geographic region being classified as a more desirable service provider system than other ones of the plurality of service provider systems in the particular geographic region;

a most recently used list containing data a predetermined number of service provider systems that previously provided service to the wireless communication device;

a system selection processor to acquire service from a service provider system, the system selection processor initially attempting to acquire service from a service provider system listed in the most recently used list and attempting to acquire service from a service provider system listed in the roaming list if service cannot be obtained from a service provider system listed in the most recently used list, the system selection processor further determining if the acquired service provider system is the more desirable service provider system in the particular geographic region; and an alternate scan list of service provider systems in the particular geographic region that are classified as more desirable service provider systems than the acquired service provider system, the system selection processor periodically attempting to acquire service from a service provider system in the alternate scan list, wherein the system selection processor sorts the alternate scan list using the most recently used list wherein entries in the alternate scan list are sequenced in accordance with the presence and sequence of service provider systems in the most recently used list.

8. The system of claim 7 wherein the system selection processor attempts to acquire a more desirable service provider system listed in the alternate scan list in the order in which the more desirable service provider systems in the particular geographic region are also listed in the most recently used list.

9. The system of claim 8 wherein the system selection processor generates the alternate scan list only if the acquired service provider system is not the more desirable service provider system in the particular geographic region.

10. The system of claim 7 wherein the system selection processor periodically attempts to acquire service from a service provider in the alternate scan list only if the acquired service provider system is not the more desirable service provider system in the particular geographic region.

11. The system of claim 7, further comprising a timer to generate periodic signals, the system selection processor periodically attempting to acquire service from a service provider system in the alternate scan list upon receipt of the periodic signals.

12. The system of claim 7 wherein a selected one of the plurality of service provider systems in the particular geographic region is designated as a most desirable service provider system, the alternate scan list also listing the most desirable service provider system and system selection processor periodically attempting to acquire service from the most desirable service provider system in the alternate scan list.

13. A method to establish a communication link between a wireless communication device and a service provider system, the method comprising:

listing a plurality of possible service provider systems that may provide service to the wireless communication device, at least a selected one of a plurality of service provider systems in a particular geographic region being classified as a more desirable service provider system than other ones of the plurality of service provider systems in the particular geographic region;

listing a predetermined number of service provider systems that previously provided service to the wireless communication device;

attempting to acquire service from a service provider system by initially attempting to acquire service from one of the predetermined number of service provider systems that previously provided service to the wireless communication device;

attempting to acquire service from one of the plurality of possible service provider systems that may provide service to the wireless communication device if service cannot be obtained from one of the predetermined number of service provider systems that previously provided service to the wireless communication device;

determining if the acquired service provider system is the more desirable service provider system in the particular geographic region;

periodically attempting to acquire service from a more desirable service provider system in the particular geographic region if the acquired service provider system is not the more desirable service provider system;

generating an alternate scan list of service provider systems in the particular geographic region that are classified as more desirable service provider systems than the acquired service provider system wherein periodically attempting to acquire service from a more desirable service provider system comprises attempting to acquire service from a service provider system in the alternate scan list; and sorting the alternate scan list using the listing of the predetermined number of service provider systems that previously provided service to the wireless communication device.

14. The method of claim 13 wherein generating the alternate scan list is performed only if the acquired service provider system is not the more desirable service provider system in the particular geographic region.

15. The method of claim 13, wherein entries in the alternate scan list are sequenced in accordance with the presence and sequence of service provider systems in the listing of the predetermined number of service provider systems that previously provided service to the wireless communication device.

16. The method of claim 15 wherein periodically attempting to acquire service from a more desirable service provider system comprises attempting to acquire service from a service provider system in the sorted alternate scan list.

17. The method of claim 13 wherein a selected one of the plurality of service provider systems in the particular geographic region is designated as a most desirable service provider system and wherein periodically attempting to acquire service from a more desirable service provider system comprises attempting to acquire service from the most desirable service provider system.

18. The method of claim 13, further comprising generating periodic signals wherein periodically attempting to acquire service from a more desirable service provider system comprises attempting to acquire service from a service provider system in response to the generation of the periodic signal.

* * * * *